United States Patent Office 3,289,715
Patented Dec. 6, 1966

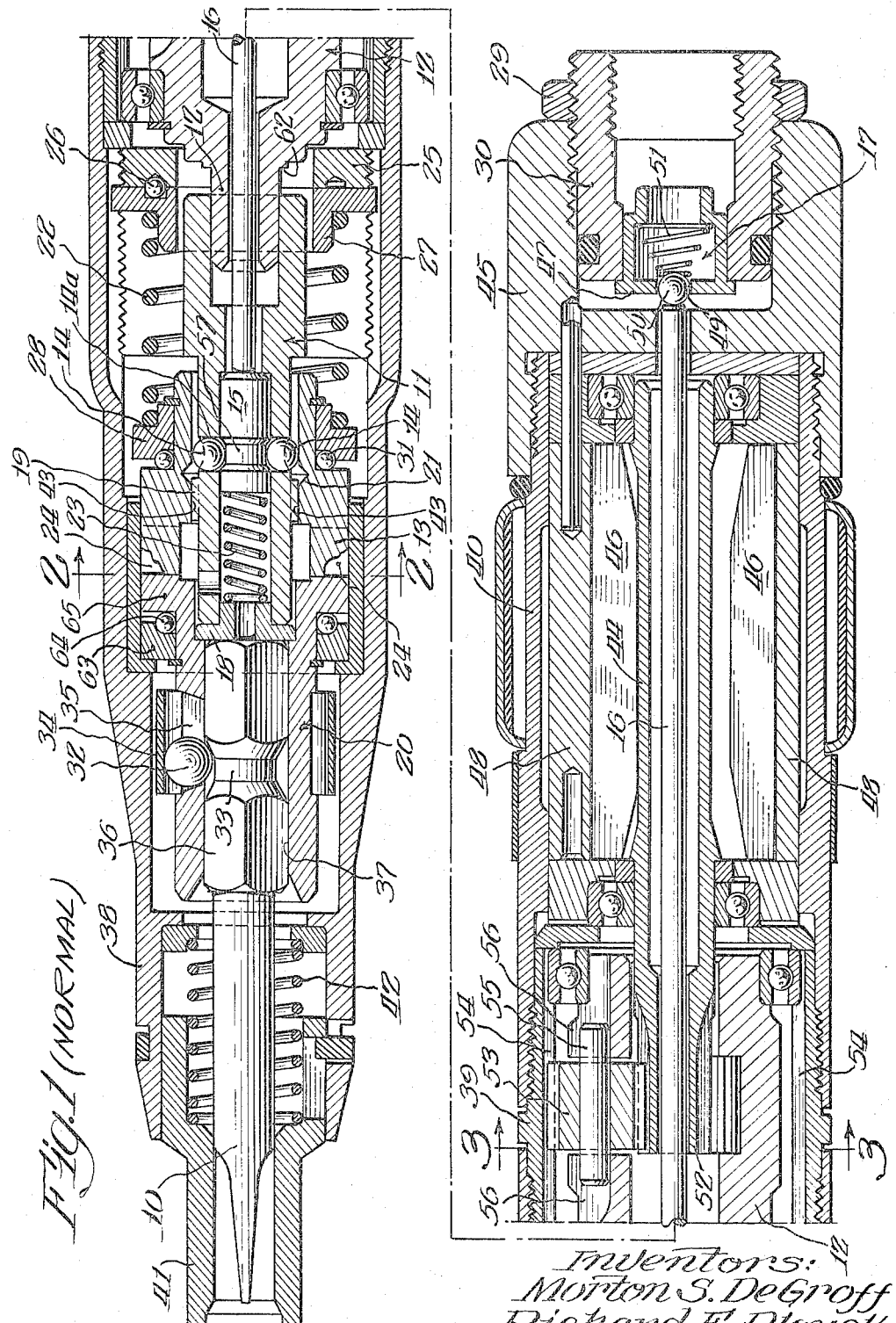

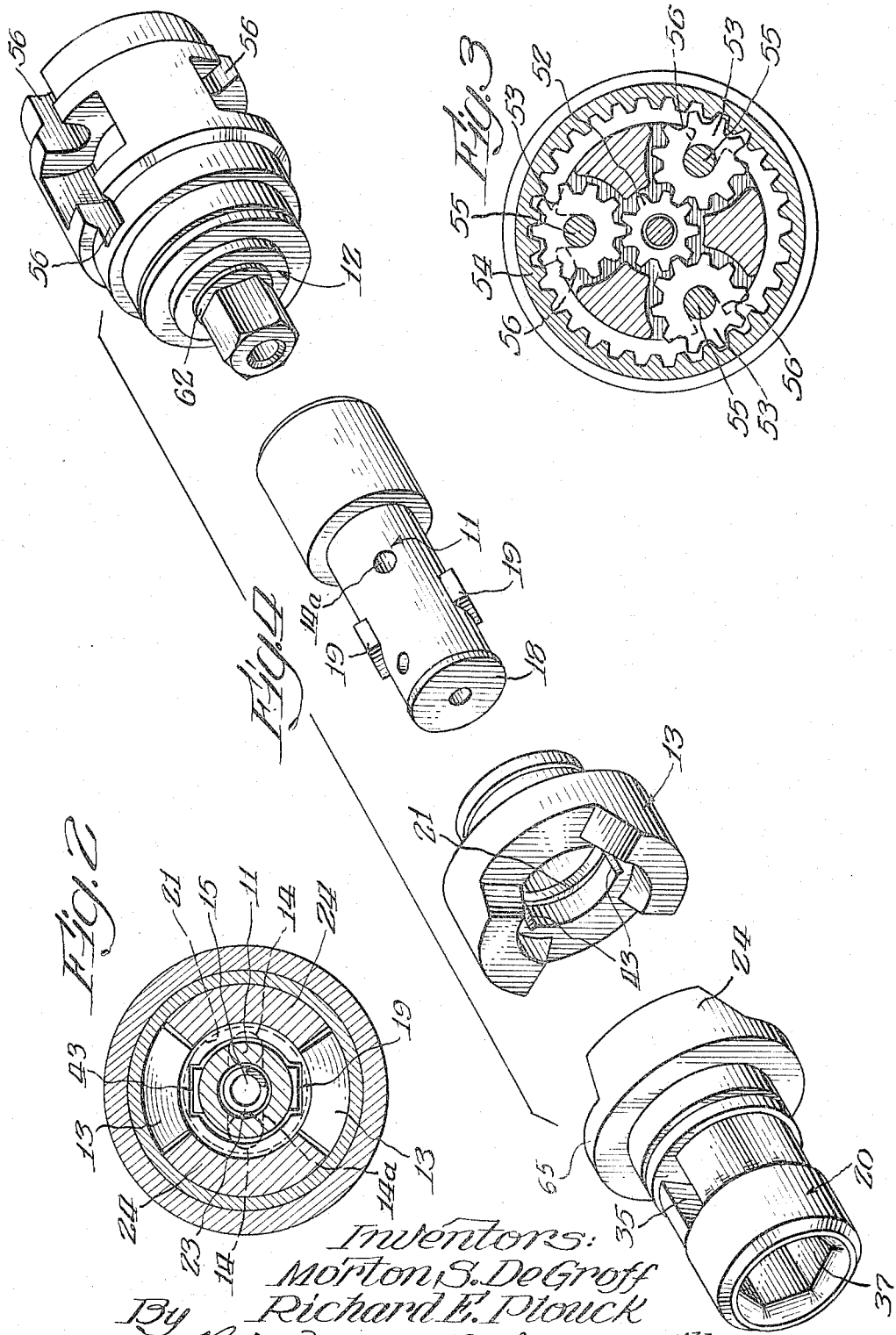

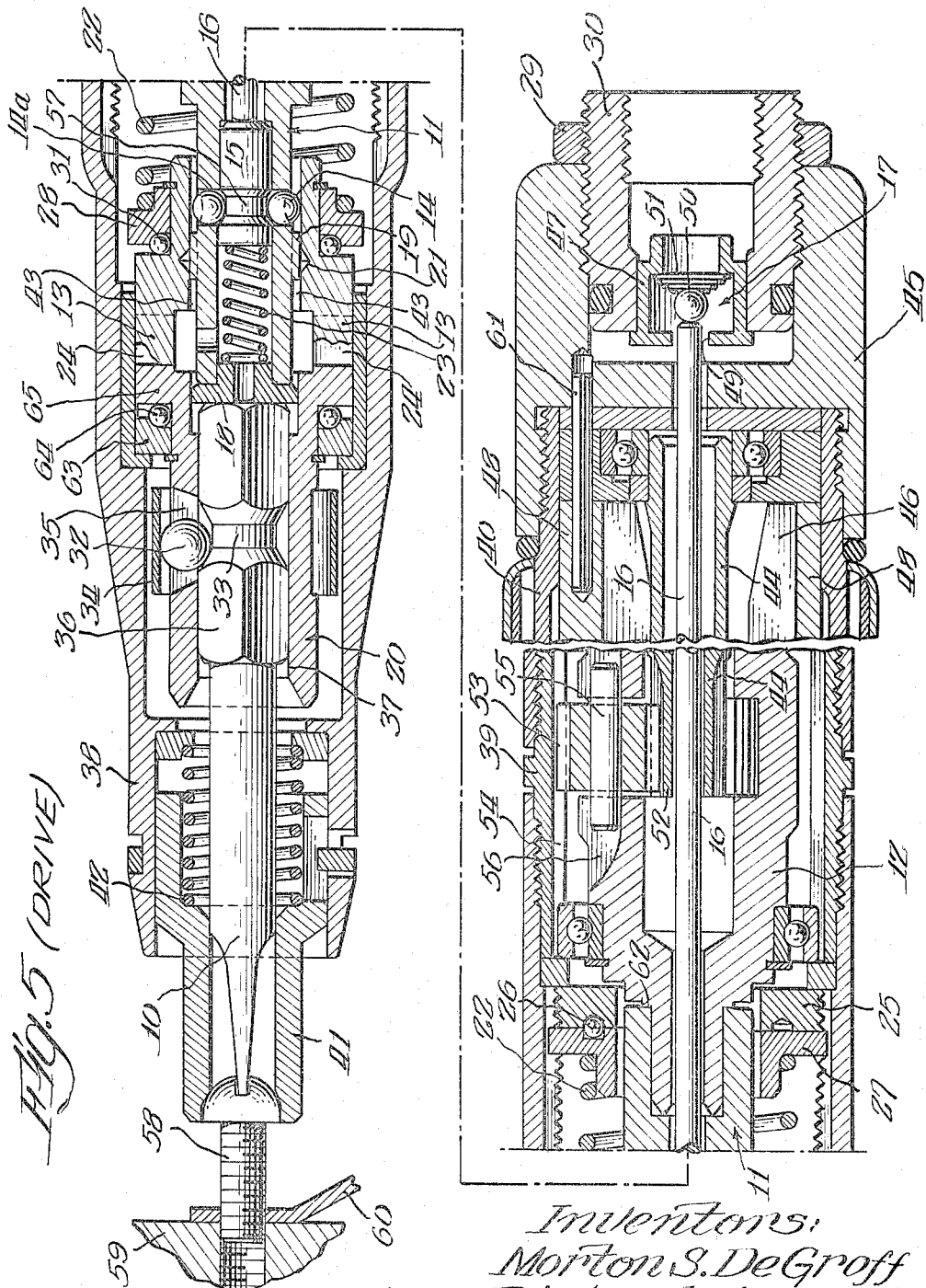
Fig. 5 (DRIVE)

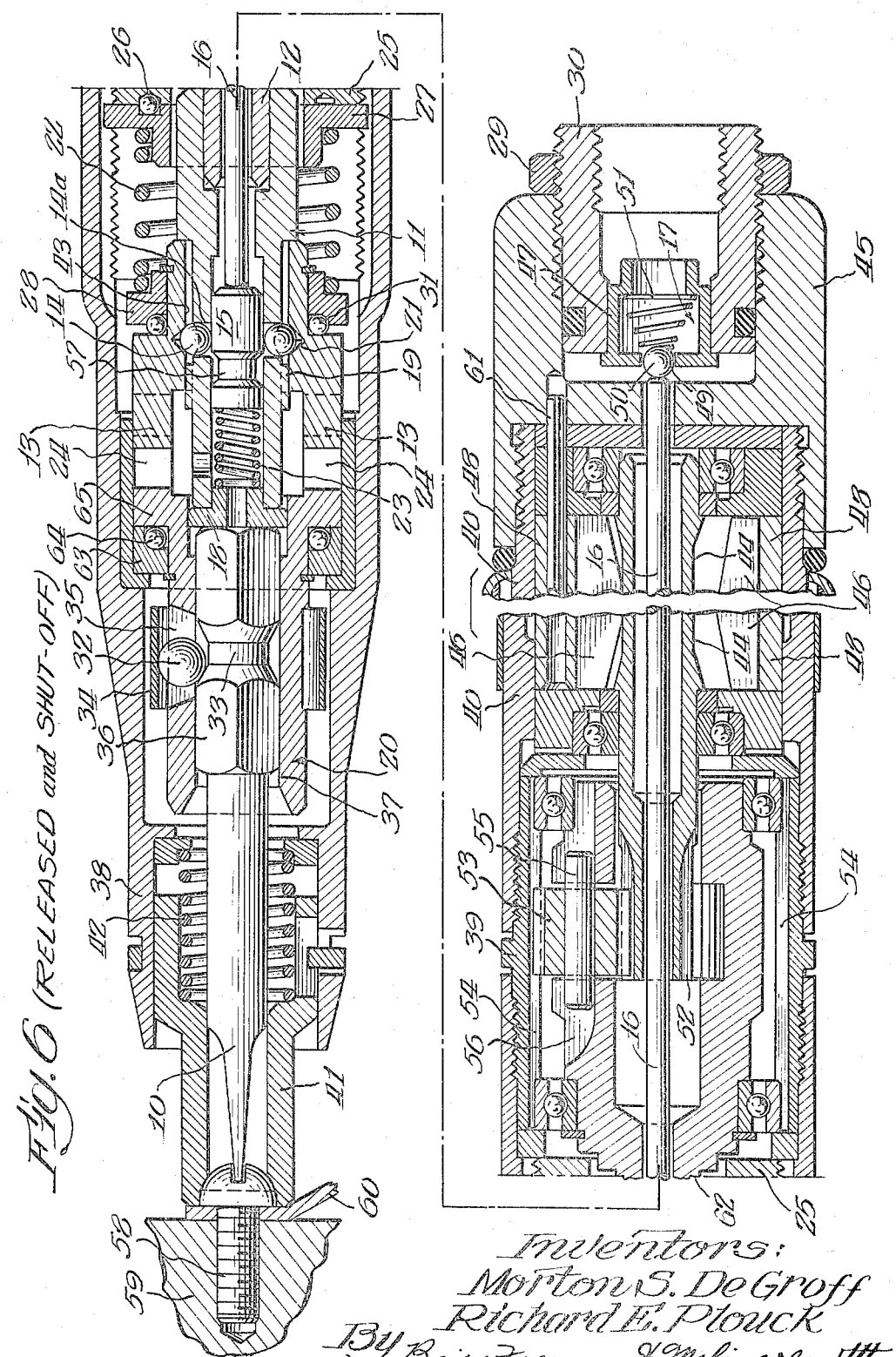

3,289,715
AUTOMATIC SHUT-OFF TOOL
Morton S. De Groff and Richard E. Plouck, Bryan, Ohio, assignors to The Aro Corporation, Bryan, Ohio, a corporation of Ohio
Filed Mar. 19, 1964, Ser. No. 353,069
8 Claims. (Cl. 144—32)

This invention relates to an automatic shut-off tool such as a screwdriver particularly designed for driving miniature screws or the like into fragile assembly components.

One object of the invention is to provide a simple automatic clutch mechanism requiring minimum skill to operate, adjust and service.

Another object is to provide means for automatically stopping tool rotation upon the attainment of predetermined torque by immediately shutting off the motor which actuates the tool thus preventing further rotation thereof.

Still another object is to provide a torque responsive clutch wherein cam faces on clutch jaws do not completely disengage but open only part way to perform the shut-off operation thus preventing malfunctioning of the clutch and preventing any possibility of ratcheting or impacting of the jaws.

A further object is to provide an arrangement of parts which eliminates the necessity of the operator pushing against the clutch spring force when operating the tool.

Still a further object is to provide means for automatically starting the motor of the tool as the operator applies the tool to the work with a minimum of force.

An additional object is to provide a clutch that automatically stops bit rotation at a prescribed resistance of the driven element thus limiting waste of compressed air.

With these and other objects in view, our invention consists in the construction, arrangement and combination of the various parts of our shut-off tool, whereby the objects above contemplated are attained, as hereinafter more fully set forth, pointed out in our claims and illustrated in detail on the accompanying drawing wherein:

FIG. 1 is an enlarged longitudinal sectional view through an automatic shut-off tool embodying our invention and showing the parts in normal position;

FIG. 2 is a vertical sectional view on the line 2—2 of FIG. 1;

FIG. 3 is a vertical sectional view on the line 3—3 of FIG. 1;

FIG. 4 is an exploded perspective view of a jaw clutch, drive sleeve and a drive spindle of our tool;

FIG. 5 is a sectional view similar to part of FIG. 1 showing the parts in drive position, and FIG. 6 is a similar sectional view showing the parts in released and shut-off position.

On the accompanying drawings we have used the reference numeral 10 to indicate a driven tool element such as a screwdriver bit. The bit 10 is removably held in a sleeve-like bit holder 20. The bit 10 has a hexagon portion 36 received in a hexagon socket 37 of the bit holder to impart rotation to the bit when the holder is rotated. The bit is held in the sleeve by means of a ball 32 in a slot 35 of the bit holder, the bit being provided with a groove 33 in the hexagon portion 36 for the ball and the ball being biased into the groove by a C-shaped leaf spring 34.

The bit 10 and the bit holder 20 are located within a housing 38 which is connected by a sleeve 39 to a pneumatic motor housing 40.

Within the forward end of the housing 38 (left-hand end in the upper half of FIG. 1) is slidably mounted a finder sleeve 41 backed by a spring 42. The bit holder 20 is driven by a clutch comprising a clutch drive jaw member 13 shown in FIG. 4 and clutch driven jaws 24, the latter being part of the bit holder. The jaw 13 is driven by a drive sleeve 11 which in turn is driven by a drive spindle 12. The sleeve 11 has drive lugs 19 slidable in keyways 43 of the jaw 13 for this purpose.

The jaws 13 are normally held seated in the jaws 24 by a clutch spring 22 interposed between a washer 27 and a thrust race 28. Thrust balls 31 are interposed between the race 28 and the clutch drive jaw member 13. A second thrust race 63 is also provided, and thrust balls 64 are interposed between it and a flange 65 on the bit holder 20. A detent ball 26 is interposed between the washer 27 and a clutch adjusting nut 25 which is provided to adjust the tension of the spring 22 and thereby the torque at which the jaws 13 are forced out of the jaws 24 during operation as will hereinafter appear, the sides of these jaws being inclined at a suitable angle for this purpose as shown in FIG. 4, the angle to the axis of rotation being greater for right-hand rotation than for left-hand rotation.

For driving the spindle 12 a pneumatic motor is provided in the housing 40 comprising the usual rotor 44 having vanes 46 radially slidable therein and which rotates in a stator 48. An air inlet valve 17 is provided in an extension 45 of the motor housing 40 as shown in the lower half of FIG. 1 which comprises a body 47 having a perforation 49 therein normally closed by a valve ball 50 located therein. Closure is effected under the action of a spring 51 and is controlled by a valve release rod 16 as will hereinafter appear. The valve 17 is mounted in an air inlet adaptor 30 to which compressed air is supplied from a suitable supply hose (not shown). The open position of the valve 17 is shown in FIG. 5.

The rotor 44 rotates at one speed and drives the spindle 12 at a lower speed. This is accomplished by a pinion 52 formed on the left-hand end of the rotor 44 and meshing with planetary gears 53 which in turn mesh with an internal gear 54 of the sleeve 39. The planetary gears are rotatable on pins 55 carried in slots 56 of the drive spindle 12.

The valve release rod 16 extends longitudinally from the valve ball 50 through the rotor 44, pinion 42 and drive spindle 12 into the drive sleeve 11 wherein it contacts a valve release piston 15 provided with an annular groove 57 in which a plurality of balls 14 are located and adapted to at times coact with an internal groove 21 in the clutch drive jaw member 13. The balls 14 are radially movable in holes 14ᵃ of the drive sleeve 11. A valve actuating spring 23 is located between the piston 15 and a plug 18 which is adapted to be contacted by the inner end of the bit 10 for pushing the drive sleeve 11 inwardly during certain portions of the operating cycle as will hereinafter appear.

*Practical operation*

In the operation of our automatic shut-off screwdriver the parts are normally in the position shown in FIG. 1.

Referring to FIG. 5, a screw 58 is illustrated to be driven into an element 59 to attach a second element 60 thereto, the illustration being merely an example. First of all, the finder 41 is located on the head of the screw 58 and the entire screwdriver forced toward the screw which results in the finder 41 being retracted against the tension of the spring 42 and the entire assembly of bit 10, plug 18, sleeve 11, balls 14 and valve release rod 16, together with the piston 15 will be forced to the right to a rest position against a shoulder 62 of the drive spindle 12, thereby opening the valve ball 50 relative to the perforation 49 to admit compressed air from the adaptor 30 through suitable porting (not shown), to the inlet side of the pneumatic motor 44–46–48. Accordingly, the motor rotates the bit 10 which drops into the slot of the screw and rotates the screw until a predetermined release torque is attained. The bore of the jaw member 13 prevents the balls 14 from moving out of the groove 57 in the piston 15.

The release torque referred to occurs when a sufficient amount of resistance acting upon the bit 10 and the bit holder 20 prevents their further rotation whereupon the clutch jaws of the member 13 climb partially out of the jaws 24 by reason of the camming action of the inclined jaw faces as shown in FIG. 6. At this time the internal groove 21 is in alignment with the balls 14 so that they are forced out of the annular groove 57 and into the internal groove 21 by centrifugal force, by air pressure in the inlet valve 17 acting on the ball 50 and by the inclined right side of the groove 57 which tends to cam the balls out of the groove. This combined action moves the rod 16 to the left against the action of the spring 23 which eliminates excessive movement of the rod without interfering with its valve shut-off function. Expansion of the spring 51 back of the valve ball 50 guides the ball into the perforation 49 and thus the motor is stopped by closure of the valve 49–50, and consequently bit rotation automatically stops.

The operating cycle is completed when the initial pressure applied to the screwdriver is relieved whereupon the springs 22, 23 and 42 return the various parts of the tool to the positions shown in FIG. 1. The clutch spring 22 at this time forces the driven jaws 13 into full mesh with the jaws 24, and the valve actuator spring 23 forces the piston 15 back and realigns its groove 57 with the balls 14. The mechanism is then ready to repeat, the parts being conditioned for another automatic screwdriving operation with automatic flow of air to the motor when the tool is applied to the work as in FIG. 5. The cam faces of the jaw members 13 and 24 remain engaged under free running conditions due to the spring force exerted by the clutch spring 22 against the drive jaw 13. Frictional forces created by the clutch spring are absorbed in the thrust races and balls 13, 28, 31, 63, 64 and 65.

From the foregoing specification it will be obvious that we have provided a comparatively simple automatic shut-off tool in which inclined clutch jaws cam into partial disengagement upon predetermined torque being attained and at the same time shut off the power to the motor so that there is no impacting of the clutch jaws after the desired torque is attained. This is particularly desirable in connection with miniature screws or the like and fragile assembly components in order to eliminate any shock that may develop from such impacting or ratcheting clutch jaws as in previous automatic shut-off tools, yet we provide accurate torque control for the screws. The linkage between the jaw clutch and the control valve is readily adjusted to compensate for manufacturing tolerances by axial adjustment of the adaptor 30 which it will be noted is threaded in the extension 45 and provided with a lock nut 29 to retain the adjustment.

Some changes may be made in the construction and arrangement of the parts of our automatic shut-off tool without departing from the real spirit and purpose of our invention, and it is our intention to cover by our claims any modified forms of structure or use of mechanical equivalents which may reasonably be included within their scope.

We claim as our invention:

1. In an automatic shut-off tool of the character disclosed, a drive spindle, a motor for rotating said drive spindle, a rotatable tool holder having a camming clutch jaw, an operative connection between said drive spindle and said tool holder comprising a drive clutch jaw member continuously meshing with said camming clutch jaw, a torque spring normally biasing said jaws to full mesh with each other, a drive element between said drive spindle and said drive clutch jaw member axially movable by engagement of a tool element in said tool holder with the work, a normally inoperative control means for said motor, an operative connection between said drive element and said control means to render the latter operable when said drive element is moved axially by engagement of the tool element with the work, and means for releasing said control means to return to normally inoperative position upon said jaws camming to a partially unmeshed position responsive to predetermined torque of the work, said last means being mechanically actuated by the relative movement of said jaws during the camming action and at a point in such action short of unmeshing of said jaws.

2. An automatic shut-off tool according to claim 1 wherein said operative connection comprises a thrust element normally locked to said drive element and thereby operable to render said control means operable, and said means for releasing is operable to unlock said thrust element relative to said drive element to permit said control means to assume said normally inoperative position while said drive element is still in the axially moved position of claim 1.

3. In an automatic shut-off tool of the character disclosed, a drive spindle, a motor for rotating said drive spindle, a rotatable tool holder having a camming clutch jaw, an operative connection between said drive spindle and said tool holder comprising a drive clutch jaw member continuously meshing with said camming clutch jaw, a torque spring normally biasing said jaws to full mesh with each other, a drive element between said drive spindle and said drive clutch jaw member axially movable by engagement of a tool element in said tool holder with the work, a normally inoperative control means for said motor, an operative connection between said drive element and said control means to render the latter operable when said drive element is moved axially by engaging a tool element with the work, and means for rendering said control means operative to return to normally inoperative position upon said jaws camming to a predetermined degree responsive to predetermined torque of the work, said predetermined degree being less than required for complete unmeshing of said clutch jaws.

4. An automatic shut-off tool according to claim 3 wherein said operative connection comprises a thrust element, a piston slidable in a bore of said drive element and adapted to move said thrust element, said piston having an annular groove, said drive element having a radial opening, a ball therein, said drive element being slidable in a bore of said drive clutch jaw member, and said bore having an annular groove to receive said ball when said last groove is aligned therewith at the time said drive clutch jaw member responds to said predetermined torque.

5. An automatic shut-off tool in accordance with claim 3 wherein said motor is pneumatically driven and said control means comprises a valve therefor, said valve being adjustable toward and away from said operative connection to compensate for manufacturing tolerances.

6. In an automatic shut-off tool, a drive spindle, a pneumatic motor for rotating said drive spindle, a rotatable tool holder having a camming clutch jaw, an operative connection between said drive spindle and said tool holder comprising a drive clutch jaw member continuously meshing with said camming clutch jaw, a torque spring normally biasing said jaws to full mesh with each other, a drive element between said drive spindle and said drive clutch jaw member axially movable by engagement of a tool element in said tool holder with the work, a normally biased closed valve for said pneumatic motor, an operative connection from said drive element to said valve to open the valve when the drive element is moved axially by engaging a tool element with the work, said operative connection comprising a thrust rod, means for locking said thrust rod to said drive element, and means for unlocking said thrust rod from said drive element to thereby permit said valve to return to normally closed position said last mentioned means being operated by said jaws upon camming thereof to a predetermined degree of unmeshing short of full unmeshing and in response to predetermined torque of the work.

7. An automatic shut-off tool in accordance with claim 6 wherein said means for locking said thrust rod to said drive element comprises lock elements interposed between said thrust rod and said drive element, and said means for unlocking comprises means carried by said drive clutch jaw member for receiving said interposed lock elements and thereby releasing said thrust rod from said lock elements.

8. An automatic shut-off tool comprising a pneumatic motor, a control valve at one end of said motor, a drive spindle at the other end thereof, said motor and said drive spindle being hollow, a rotatable tool holder having a camming clutch jaw, an operative connection between said drive spindle and said tool holder comprising a drive clutch jaw member continuously meshing with said camming clutch jaw, a torque spring normally biasing said jaws to full mesh with each other, a drive element between said drive spindle and said drive clutch member axially movable by engagement of a tool element in said tool holder with the work, an operative connection between said drive element and said control valve to open said control valve when the drive element is moved axially by engaging the tool element with the work, said operative connection comprising a thrust rod extending through said drive spindle and said motor to said control valve, a piston located in said drive element slidable therein and engageable with said thrust rod, said drive element having a radial opening, a ball therein, said drive element being slidable in said drive clutch jaw member and the latter being slidable on said drive element and having a groove to receive said ball and thereby release said control valve to return to normally closed position upon said jaws camming to a predetermined degree responsive to predetermined torque of the work, said predetermined degree being less than required for complete unmeshing of said clutch jaws.

References Cited by the Examiner
UNITED STATES PATENTS

| | | | |
|---|---|---|---|
| 2,484,364 | 10/1949 | Whitledge | 144—32 |
| 2,886,075 | 5/1959 | Skoog | 144—32 |

FOREIGN PATENTS

| | | |
|---|---|---|
| 810,620 | 6/1951 | Germany. |
| 99,340 | 9/1921 | Switzerland. |

WILLIAM W. DYER, Jr., *Primary Examiner.*

R. J. ZLOTNIK, *Assistant Examiner.*